United States Patent [19]
Gusdorf et al.

[11] 3,738,287
[45] June 12, 1973

[54] HUB AND LEG MOUNTING FOR PEDESTAL STANDS

[75] Inventors: Walter Gusdorf, Creve Coeur; Charles F. Camilleri, Affton, both of Mo.

[73] Assignee: Gusdorf & Sons, Inc., St. Louis, Mo.

[22] Filed: Oct. 20, 1971

[21] Appl. No.: 190,976

[52] U.S. Cl. ............... 108/150, 108/142, 108/156, 248/418, 248/188, 248/188.7
[51] Int. Cl. ............................................. A47b 13/02
[58] Field of Search ................... 108/139, 142, 150, 108/156; 248/151, 163, 188, 188.7, 415, 418, 425

[56] References Cited
UNITED STATES PATENTS

| 1,869,535 | 8/1932 | Andren | 108/142 X |
| 782,932 | 2/1905 | Uhl | 248/415 |
| 979,123 | 12/1910 | Bohrer | 248/151 |

Primary Examiner—James C. Mitchell
Attorney—Frederick M. Woodruff and Edward A. Boeschenstein

[57] ABSTRACT

A pedestal stand for accessory appliances, such as television and radio receivers, and record players, having a mounting hub connecting the several legs in a secure manner so that the top of the stand is rendered stable and capable of swivelling for directional settings.

9 Claims, 5 Drawing Figures

PATENTED JUN 12 1973  3,738,287
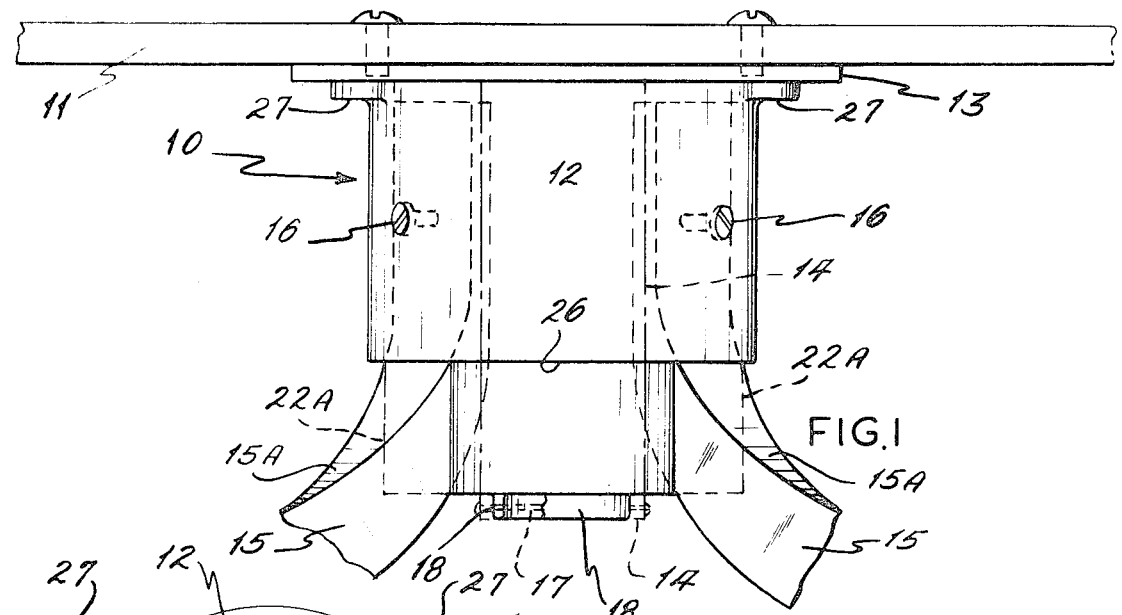
FIG. 1
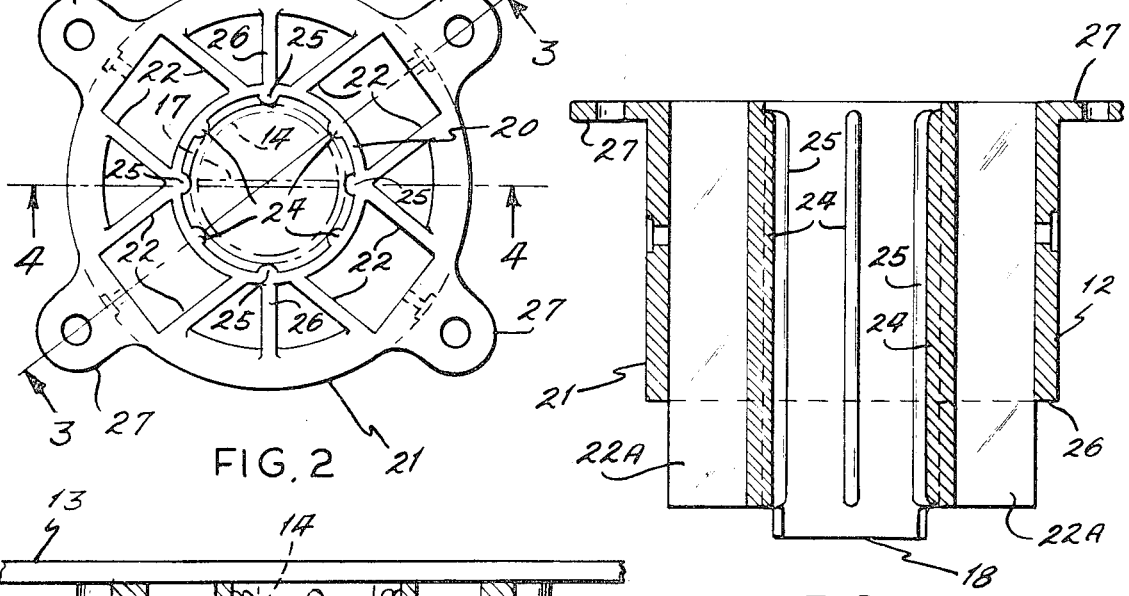
FIG. 2
FIG. 3
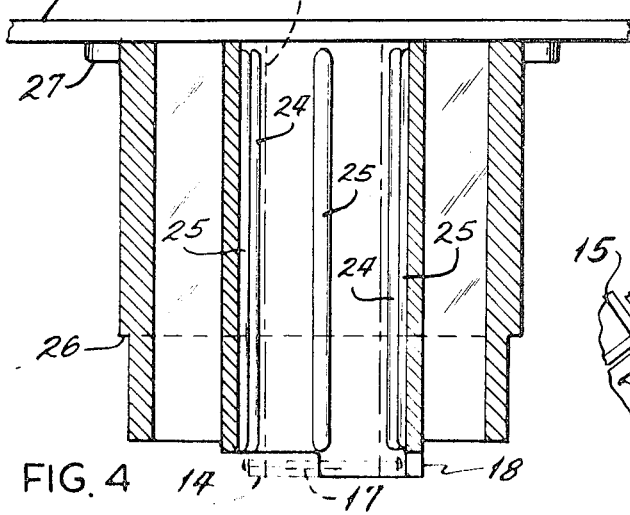
FIG. 4
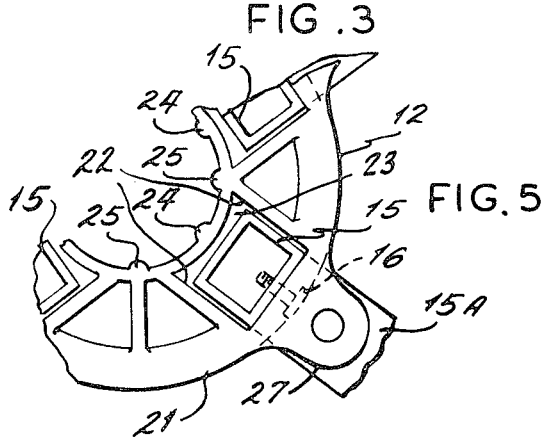
FIG. 5

HUB AND LEG MOUNTING FOR PEDESTAL STANDS

SUMMARY OF THE INVENTION

The present invention is particularly concerned with improvements in the hub and leg mounting for a pedestal type stand on which an object such as a television set can be supported.

The improved stand of this invention is directed toward obtaining a stable connection between the legs and top platform of a stand on which a heavy object, such as a television set, can be supported with assurance that the stand will not tip due to any eccentric weight distribution of the components of the object. The usual stand of this class has the legs individually connected to the top platform at widely spaced points so that the top can carry relatively heavy loads in any position on the top. However, such a stand is difficult to construct so the top can swivel for facing the set in a desired direction. Oftentimes the whole stand must be turned and when a floor covering is present some of the legs are raised to engage the covering while others are not raised. This leads to an unstable condition and does not enhance the security of objects thereon when the stand has some legs on and some off the floor covering.

The objects of this invention are to provide a unique and simple hub and leg connection for a stand, to provide the hub with means to have it adaptable for manufacturing tolerances so that the swivel post received in the hub will be properly received; to provide a hub with means to receive and secure the legs in stable cooperation; to provide a hub member capable of bringing a plurality of legs together in a central cluster so that swivelling movement of the top may be easily and inexpensively achieved; and to provide a pedestal stand with a new and improved leg and hub assembly so the top can be selectively mounted for fixed or swivelling action. Other advantages and features of the stand and its components will appear in connection with the following description.

BRIEF DESCRIPTION OF THE DRAWINGS

In the accompanying drawings of a presently preferred embodiment;

FIG. 1 is a fragmentary elevational view of so much of the assembly as will show the preferred embodiment of the operating components;

FIG. 2 is a top plan view of the hub for the pedestal stand;

FIG. 3 is a sectional view taken at line 3-3 in FIG. 2;

FIG. 4 is a sectional view similar to FIG. 3, but seen at line 4—4 in FIG. 2, the view being shown with the swivel post in phantom outline; and FIG. 5 is a fragmentary view of a typical leg mounting detail, the leg being shown in section in this view.

DESCRIPTION OF THE EMBODIMENT

FIG. 1 illustrates the hub and leg assembly 10 in supporting relation to the top 11 of the stand. The hub 12 engages on the under side of a plate 13 which carries a post 14 in depending relation to extend downwardly through the hub 12. The plate 13 is suitably anchored to the under side of the top 11 so that the top, together with plate 13 and its depending post 14 can swivel relative to the hub 12. The hub 12 is formed to connect the upper ends of the legs 15 in a central cluster, with each leg 15 held in the hub 12 by a suitable threaded element 16. A keeper pin 17 is inserted in the lower end of the post 14 to project out so its free ends are stopped from turning beyond about 90° by spaced stop projections 18 formed on the hub 12.

In FIGS. 2 and 3, the hub 12 is molded of a suitable material that has sufficient rigidity for the purposes to be noted, but may be flexed in certain areas to accommodate such need. A suitable moldable polycarbonate material is available from General Electric under the trademark LEXAN. This material can be impregnated with pigment to produce a desirable color effect.

The hub 12 includes a center tubular core 20 surrounded by an outer wall sheath 21. The core tube 20 and the sheath 21 are held in concentric relationship by radially directed walls which extend axially throughout most of the axial dimension of the hub. The radial walls include four sets of walls 22 which are essentially parallel to each other in a set. These walls 22 and the included walls of the core tube 20 and sheath 21 together define elongated sockets for the reception of the upper ends of the respective legs 15. In mounting a leg end in its socket, the securing means 16 engages in the outer wall of the leg (FIG. 5) and draws it solidly against the inner surface of the sheath 21. Thus, the leg 15 is held solidly in its socket and a small clearance space 23 is left between the inner surface of the leg 15 and the outer surface of the core tube 20. This feature is typical of each leg mounting.

In FIGS. 2, 3, 4 and 5 the core tube is seen to be provided within its inner surface with a plurality of ribs which project radially inwardly to form surfaces engaged by the swivel post 14. Ribs 24 are located approximately at 90° spacing and are carried by the core tube 20 in locations where the wall of the core tube may flex. On the other hand, ribs 25 are spaced apart so as to be between the respective ribs 24. As seen in FIG. 2, a pair of opposed ribs 25 are located at the junction of the socket sidewalls 22 so that a solid backing is provided. The other pair of ribs 25 are backed up in the core tube 20 by radial wall elements 26 for a similar backing. Thus, the alternate ribs 25 are held against flexing movement and are stable ribs, as distinguished from the flexible ribs 24. Each rib 24 and 25 extends axially in the core tube 20 from near the upper end to near the bottom where the hub is formed with extensions 22A of the leg socket walls 22. As is shown in FIGS. 1 and 3, the core tube 20 extends below the adjacent wall extensions 22A to form the stop elements 18, and since there are two such extensions (only one being shown in FIG. 3) spaced at opposite leg sockets a pair of slots are formed within which the keeper pin 17 is free to move through an angular sweep of about 90°, thereby limiting the angular swivelling movement of the plate 13 relative to the hub 12.

The feature of the ribs 24 and 25 is important to take care of the tolerance variations encountered in the post 14. In an actual example, the post 14 is sized for a nominal outside diameter of 1.625 inches. The set of four stable ribs 25 protruded inwardly to have the inner surfaces on a diameter of 1.634 inches, plus or minus 0.003 inches, while the flexible ribs 24 protruded inwardly to have the inner surfaces on a diameter of 1.623 plus or minus 0.003 inches. In this manner, the size tolerances variations of the post 14 are provided for so that the post 14 will have a hand press fit in the core tube 20 by engaging the surfaces of the respective ribs, and as the stable ribs 25 are on a larger diameter circle while the flexible ribs 24 are on a smaller diameter circle, the post 14 will engage the flexible ribs and cause them to flex radially. Should the post 14 exceed its nominal diameter, the stable ribs 25 will be engaged thereby, preventing the post from wabbling or having a too loose fit. It is also evident from FIG. 1 that the hub 12 has an upper body form of uniform size from adjacent the swivel plate 13 to the belt edge 26, and from the belt edge 26 the body depends due to the wall extensions 22A for the leg sockets. The wall extensions 22A embrace the sides of the legs 15 but do not interfere with the outwardly formed curved leg surfaces 15A. This manner of molding the hub 12 allows the respective legs 15 to assume a convenient spread at an early stage in leaving the hub sockets, thereby gaining a sufficient leg spread between the hub 12 and the supporting floor surface (not necessary to show).

In use, the legs 15 engage the floor at widely spaced points to give the hub 12 stable support against tipping. When used to support a television receiver on the top 11, the television can be turned with the top to the limits of the stops 18 as the turning of the post 14 in the core tube 20 is limited by the pin 17, and the pin 17 keeps the post 14 from being pulled out of the hub core tube 20.

As shown in FIGS. 1 and 2 the hub 12 is formed with spaced ears 27 for the alternate attachment of the hub directly to the underside of top 11 should the swivel means 13 and 14 not be desired.

In the foregoing description it is evident that the hub member 12 is axially elongated so that the core tube 20 will have an axial bore to receive and provide a stable support for the post 14. The several ribs 24 and 25 have an axial length in the bore of the tube 20 to stabilize the post 14 against lateral play and accommodate the tolerance variations of the post so that in assembly the post has a hand push fit that is neither too tight nor too loose for the intended swivelling action of the top 11. This is important as objects placed on the top 11 may often times be eccentrically weighted. A television receiver is a good example of an eccentrically weighted object. In molding the hub member, the various axial passages and leg sockets have a suitable draft angle so the parts of the mold may be separated easily. As a result of using known molding methods the leg sockets spaced around the core tube are given the desired form to engage the inserted length of the legs 15 along the maximum axial extend of the surface engagement at sidewalls 22 and the inner wall surface of the surrounding body sheath 21.

What is claimed is:

1. In a pedestal stand having a top platform, the improvement for supporting the stand top platform of a plurality of legs having floor engaging ends and opposite upper ends, a hub member supporting the top platform and formed with a plurality of substantially parallel spaced sockets, said hub member comprising a molded body having a core tube and an enclosing sheath surrounding said core tube and spaced therefrom by a plurality of radially directed walls circumferentially spaced to form sidewalls for said leg sockets, said sheath having inner surfaces cooperating with pairs of said radial walls to form at least three surfaces engaged by said leg upper ends, said sockets receiving the upper ends of the legs and positioning the legs in a cluster, and means securing each leg upper end in its respective socket.

2. The improvement set fourth in claim 1, wherein said securing means extends through said sheath inner surfaces to engage said leg upper ends, said securing means clamping said leg upper ends against said sheath inner surfaces.

3. The improvement set forth in claim 1 wherein said radially spaced core tube, enclosing sheath parts, and pairs of radially directed walls interconnecting said core tube and sheath parts combine to form elongated sockets for said leg upper ends, said sockets extending generally parallel with and axially of said hub member and being open opposite the top platform.

4. A hub and leg assembly for a pedestal stand having a top platform, said assembly consisting of an axially elongated hub member having a core tube providing a tubular bore centrally thereof and a plurality of spaced socket recesses surrounding said central bore of said core tube, a plurality of inwardly protruding ribs in said tubular bore extending axially of said hub members, a post turnably engaged in said central bore, said ribs being engaged by said post, certain of said ribs being flexible to yield and accommodate tolerance variations of said post, means connecting said post to the top platform, legs having end portions engaged in said spaced sockets and extending axially adjacent said tubular bore, and means securing said leg portions to said hub member.

5. The assembly of claim 4 wherein certain of said ribs protrude into said tubular bore more than others thereof, said certain ribs being flexible to yield to a post having greater than a nominal size.

6. The assembly of claim 4 wherein said hub member is formed of a moldable material and said sockets are spaced about said tubular bore and extend radially outwardly thereof to receive said legs in a cluster about said tubular bore.

7. The assembly of claim 4 wherein certain of said ribs are disposed radially inwardly of each leg socket, others of said ribs being disposed in said tubular bore between said certain ribs, said leg securing means holding said legs out of contact with core tube whereby said certain ribs are free to flex radially outwardly with tolerance variations of said post, and said others of said ribs maintaining stable positions relative to said certain flexible ribs.

8. A mounting hub for connecting the top platform of a pedestal to a plurality of supporting legs, said hub consisting of a molded body having an outer wall sheath, an inner core member spaced from said wall sheath, a plurality of wall elements extending between and interconnecting said wall sheath and inner core, said wall elements including a plurality of laterally spaced sets of elements in which the elements of a set are spaced apart and are essentially parallel with each other to define with said wall sheath and inner core a socket for receiving a supporting leg, and means to connect said hub to the top platform.

9. The mounting hub of claim 8 wherein said inner core member is hollow and is formed with ribs thereon in laterally spaced relation, first ones of said ribs being held in relatively fixed positions by certain elements of said sets of elements and second ones of said ribs being located between said first ones and being relatively flexible, said connecting means engaging on said ribs in said core member.

* * * * *